UNITED STATES PATENT OFFICE.

BENJAMIN BATES, OF BALTIMORE, MARYLAND.

IMPROVEMENT IN ROOT OR TONIC BEER.

Specification forming part of Letters Patent No. 113,617, dated April 11, 1871.

Be it known that I, Dr. BENJAMIN BATES, of the city of Baltimore and the State of Maryland, have invented certain Improvements in the Method of Manufacturing and Compounding of Root or Tonic Beer, of which the following is a specification:

The nature of my invention consists, first, in the use of pulverized or concentrated hops, sassafras, ginger, and Southern prickly-ash in the manufacturing or compounding of all root or tonic beers made wholly or in part of the articles hereinbefore mentioned; second, in substituting the use of glycerine for that of sugar, for sweetening said beer and for the better preservation of its quality.

The advantages gained in the use of said pulverized or concentrated hops, sassafras, ginger, and Southern prickly-ash are, that in their crude state they must be cooked or steeped in water, by which the medicinal and flavoring properties of these articles are much deteriorated, and in some respects entirely lost; also, that when the crude articles are cooked and left to cool, as they must be, there is a great liability of their going into vinous fermentation or souring, and becoming entirely worthless, whereas the pulverized or concentrated roots or barks are put direct into the compounding-tub with cold water, where their full strength and flavor are at once extracted, the cold water readily taking up most, if not all, the medicinal and flavoring properties of said roots or barks in their pulverized state, at a great saving of time and trouble.

By the use of the pulverized or concentrated roots or barks herein mentioned in the manufacturing or compounding of root or tonic beer, I am not only enabled to produce, at much less cost of time and labor, a more desirable article in quality and flavor, but also one that is not liable to ferment or sour during the process of manufacture, and that will keep, without deterioration, for a great while after being bottled.

The advantage of the treating of root or tonic beer with glycerine instead of sugar, or in combination with sugar, is that the glycerine gives to the beer greater durability in warm latitudes, whereas the sugar, when used alone, is apt to separate or precipitate, thereby changing the flavor of the beer or increasing its liability to fermentation.

The glycerine more readily incorporates itself with the beer than does the sugar, and not only prevents or removes the cause of fermentation or decay, but also leaves the beer clear or limpid, and, consequently, more merchantable.

What I claim is—

1. Pulverized or concentrated hops, sassafras, ginger, and Southern prickly-ash in the manufacturing or compounding of all root or tonic beers made wholly or in part of the roots or barks herein set forth.

2. Glycerine in the manufacture or compounding of root or tonic beer, for the purpose herein set forth.

DR. BENJAMIN BATES.

Witnesses:
   WM. H. BAYZAND,
   C. H. SLICER.